United States Patent
Wang

(10) Patent No.: US 10,046,406 B2
(45) Date of Patent: Aug. 14, 2018

(54) TURNING AND THREAD-ROLLING MACHINE WITH PRE-COMPRESSION DEVICE

(71) Applicant: DER FUN PRESTRESSED METAL CO., LTD., Taoyuan (TW)

(72) Inventor: Tien-Fa Wang, Taoyuan (TW)

(73) Assignee: DER FUN PRESTRESSED METAL CO., LTD., Taoyuan (TW)

( * ) Notice: Subject to any disclaimer, the term of this patent is extended or adjusted under 35 U.S.C. 154(b) by 0 days.

(21) Appl. No.: 15/611,857

(22) Filed: Jun. 2, 2017

(65) Prior Publication Data

US 2018/0185940 A1  Jul. 5, 2018

(30) Foreign Application Priority Data

Jan. 5, 2017 (TW) .............................. 106100270 A

(51) Int. Cl.
  *B23G 1/02* (2006.01)
  *B23B 3/06* (2006.01)
  (Continued)

(52) U.S. Cl.
  CPC ................ *B23G 1/02* (2013.01); *B21B 1/163* (2013.01); *B21H 3/02* (2013.01); *B23B 3/065* (2013.01);
  (Continued)

(58) Field of Classification Search
  CPC . Y10T 29/5109; Y10T 29/5114; B23B 3/065; B23B 3/162; B23B 3/165;
  (Continued)

(56) References Cited

U.S. PATENT DOCUMENTS 1,367,951 A * 2/1921 Eden, Jr. .................. B23G 1/04
  470/58
3,165,768 A * 1/1965 Herbkersman .......... B23G 1/22
  408/148
(Continued)

FOREIGN PATENT DOCUMENTS

JP  60096322 A * 5/1985  ............. B21D 41/04
JP  60127035 A * 7/1985  ............... B21H 3/02
JP  06039468 A * 2/1994

*Primary Examiner* — Sunil K Singh
*Assistant Examiner* — Michael Vitale
(74) *Attorney, Agent, or Firm* — Bacon & Thomas, PLLC

(57) ABSTRACT

A turning and thread-rolling machine with a pre-compression device includes a fixing base on which the pre-compression device, a fixing mechanism, a guiding base, a processing mechanism assembly, and a control unit are provided, wherein the pre-compression device includes a carrier and at least two cold-rolling heads in order to form by compression a pre-compressed annular groove in a portion of an unprocessed rebar that is adjacent to one end thereof, and, under the control of the control unit, the fixing mechanism clamps the rebar, and the guiding base displaces the processing mechanism assembly to the end of the rebar to perform turning and thread rolling sequentially, thereby processing the end of the rebar into a coupling end. The pre-compressed annular groove facilitates on-site inspection of thread quality and prevents the thread-rolling dies in the processing mechanism assembly from contact with, and hence damage by, the ribs on the rebar.

13 Claims, 13 Drawing Sheets

(51) Int. Cl.
*B21H 3/02* (2006.01)
*B23G 11/00* (2006.01)
*B23B 11/00* (2006.01)
*B21B 1/16* (2006.01)

(52) U.S. Cl.
CPC .............. *B23B 11/00* (2013.01); *B23G 11/00* (2013.01); *Y10T 29/5114* (2015.01)

(58) Field of Classification Search
CPC ........... B23B 3/168; B23B 11/00; B23G 1/02; B23G 11/00; B21H 3/02; B21H 3/042; B21H 3/044; B21H 3/046; B21H 3/048; B21B 1/163; B21B 31/08
USPC .................. 29/27 C, 27 R; 72/104, 108, 121
See application file for complete search history.

(56) References Cited

U.S. PATENT DOCUMENTS

| | | | | |
|---|---|---|---|---|
| 4,122,572 | A * | 10/1978 | Pauls | B23G 3/08 470/176 |
| 5,885,199 | A * | 3/1999 | Shao | B23F 17/006 29/27 C |
| 8,800,125 | B2 * | 8/2014 | Stanik | B21H 3/04 29/27 C |
| 9,015,915 | B1 * | 4/2015 | Soltys | B23P 23/02 29/33 T |
| 2009/0320656 | A1 * | 12/2009 | Sasu | B23B 3/06 82/129 |
| 2010/0113172 | A1 * | 5/2010 | Braun | B21H 3/04 470/57 |

* cited by examiner

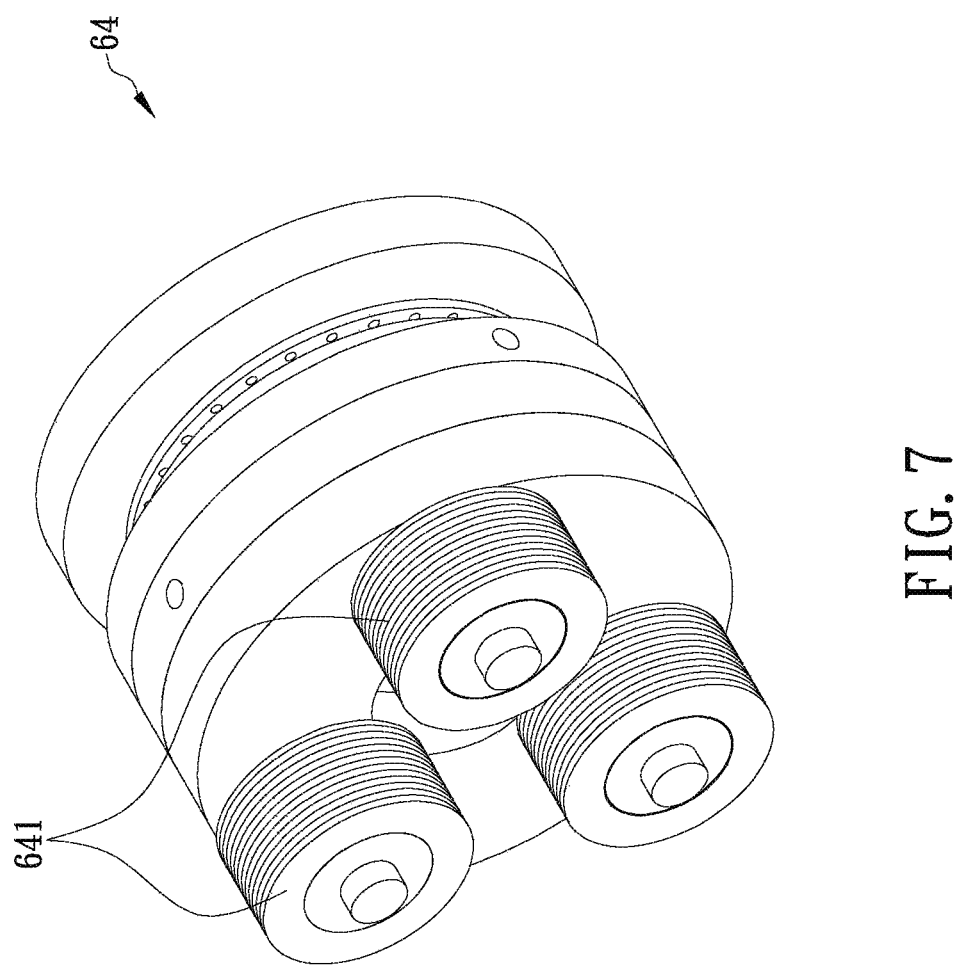

TURNING AND THREAD-ROLLING MACHINE WITH PRE-COMPRESSION DEVICE

FIELD OF THE INVENTION

The present invention relates to a turning and thread-rolling machine with a pre-compression device. More particularly, the invention relates to the structure of a machine that, before performing turning and thread-rolling operations on a portion of an unprocessed reinforcing bar that is adjacent to one end thereof, forms a pre-compressed annular groove in the aforesaid portion of the unprocessed reinforcing bar with a pre-compression device to prevent contact between the ribs on the unprocessed reinforcing bar and the thread-rolling dies used in the thread-rolling operation, thereby ensuring that the service life of the machine will not end prematurely.

BACKGROUND OF THE INVENTION

Reinforcing bars, or rebars for short, are one of the most extensively used construction materials in modern buildings. To adapt the lengths of rebars to buildings of different specifications, and to solve the problem of insufficient length of a single rebar, it is common practice during the construction process to couple two rebars with a "mechanical rebar coupler". The quality of such rebar couplers is of paramount importance because it has direct impact on the overall tensile strength and torsional strength of the coupled rebars.

Generally speaking, an "unprocessed rebar" is not an ideal or smooth cylinder but has ribs protruding from its surface. To prepare an end of an unprocessed rebar for coupling, it is required that the end be turned and threaded before it is locked into a rebar coupler. Conventionally, the rebar portion that is adjacent to the to-be-coupled end must be cold-rolled to form a smooth-surfaced cylindrical structure and thereby ensure the precision of subsequent turning and thread-rolling operations. However, as cold rolling, turning, and thread rolling are carried out by separate mechanisms, not only is it necessary for a construction company to buy machines of different functions, but also the entire processing process is time-consuming, simply considering the time it takes to transfer a cold-rolled rebar to a turning machine and a turned rebar to a thread-rolling machine. In addition, the machines take up considerable space in a factory.

Moreover, if the thread-rolling dies in the thread-rolling machine come into contact with the portion of a rebar that is not cold-rolled, it is very likely that the thread-rolling dies will be damaged by the protruding ribs. The issue to be addressed by the present invention, therefore, is to improve, integrate, and reduce the space occupied by, the foregoing mechanisms and to make adjustments in the processing procedure so as to increase the strength of a processed rebar and protect thread-rolling dies from damage.

BRIEF SUMMARY OF THE INVENTION

It is an objective of the present invention to provide a turning and thread-rolling machine having a pre-compression device, wherein the machine includes a fixing base, a fixing mechanism, a guiding base, a processing mechanism assembly, and a control unit, in addition to the pre-compression device. The fixing base has its bottom side fixed on a flat surface. The pre-compression device includes a pre-compression structure, a carrier, and at least two driving devices. The pre-compression structure is provided on the fixing base at a position adjacent to the front end of the fixing base and is penetrated by a cold-rolling opening that opens at both the front and rear ends of the pre-compression structure. The pre-compression structure is also formed with at least two mounting grooves that extend in the radial direction of the pre-compression structure and are equally angularly spaced from each other. Each mounting groove has one end exposed on the outer periphery of the pre-compression structure and the other end in communication with the cold-rolling opening. In addition, the wall of each mounting groove is provided with a guiding portion. The carrier is fixedly provided on the pre-compression structure, is exposed in the cold-rolling opening, and has a top portion formed with a carrying groove. The two driving devices are mounted in the mounting grooves respectively and are each provided with a cold-rolling head at one end, wherein each cold-rolling head is formed with a forming groove. The contours of the forming grooves and of the carrying groove can join together to form a compression space therebetween, wherein the compression space has a smaller diameter than an unprocessed rebar. The fixing mechanism is locked on the fixing base at a position corresponding to the rear end of the pre-compression device and is provided with two clamping jaws. The guiding base has its bottom side locked on the fixing base at a position corresponding to the rear end of the fixing mechanism and is provided with a transverse translation mechanism and a longitudinal translation mechanism. The processing mechanism assembly is locked on the top side of the guiding base and is transversely provided with a starting mechanism, a turning mechanism, and a thread-rolling mechanism, wherein the front end of the starting mechanism is provided with a position detection rod. The control unit is separately and electrically connected with the pre-compression device, the fixing mechanism, the transverse translation mechanism, the longitudinal translation mechanism, and the processing mechanism assembly. Once a portion of the unprocessed rebar that is adjacent to one end thereof is inserted into the cold-rolling opening and is placed on the wall of the carrying groove, the control unit drives the driving devices to displace the cold-rolling heads simultaneously toward the center of the cold-rolling opening, in order for the cold-rolling heads and the carrier to compress the unprocessed rebar and thereby form a pre-compressed annular groove in the portion of the unprocessed rebar that is adjacent to the aforesaid end thereof. In the meantime, a to-be-processed portion is also formed between the end of the unprocessed rebar and the pre-compressed annular groove. When the end of the unprocessed rebar is further inserted into a space above the guiding base and is pressed against the position detection rod, the control unit not only drives the fixing mechanism to clamp a middle section of the unprocessed rebar, but also drives the transverse translation mechanism and the longitudinal translation mechanism so that the turning mechanism and the thread-rolling mechanism are sequentially displaced to a position corresponding to the to-be-processed portion to perform turning and thread rolling respectively, thereby processing the to-be-processed portion into a coupling end.

BRIEF DESCRIPTION OF THE SEVERAL VIEWS OF THE DRAWINGS

The actuation method, structural features, effects, and objectives of the present invention can be better understood by referring to the following detailed description of an embodiment with reference to the accompanying drawings, in which:

FIG. 7 is a perspective view of the thread-rolling mechanism of the present invention;

DETAILED DESCRIPTION OF THE INVENTION

Figure 1:
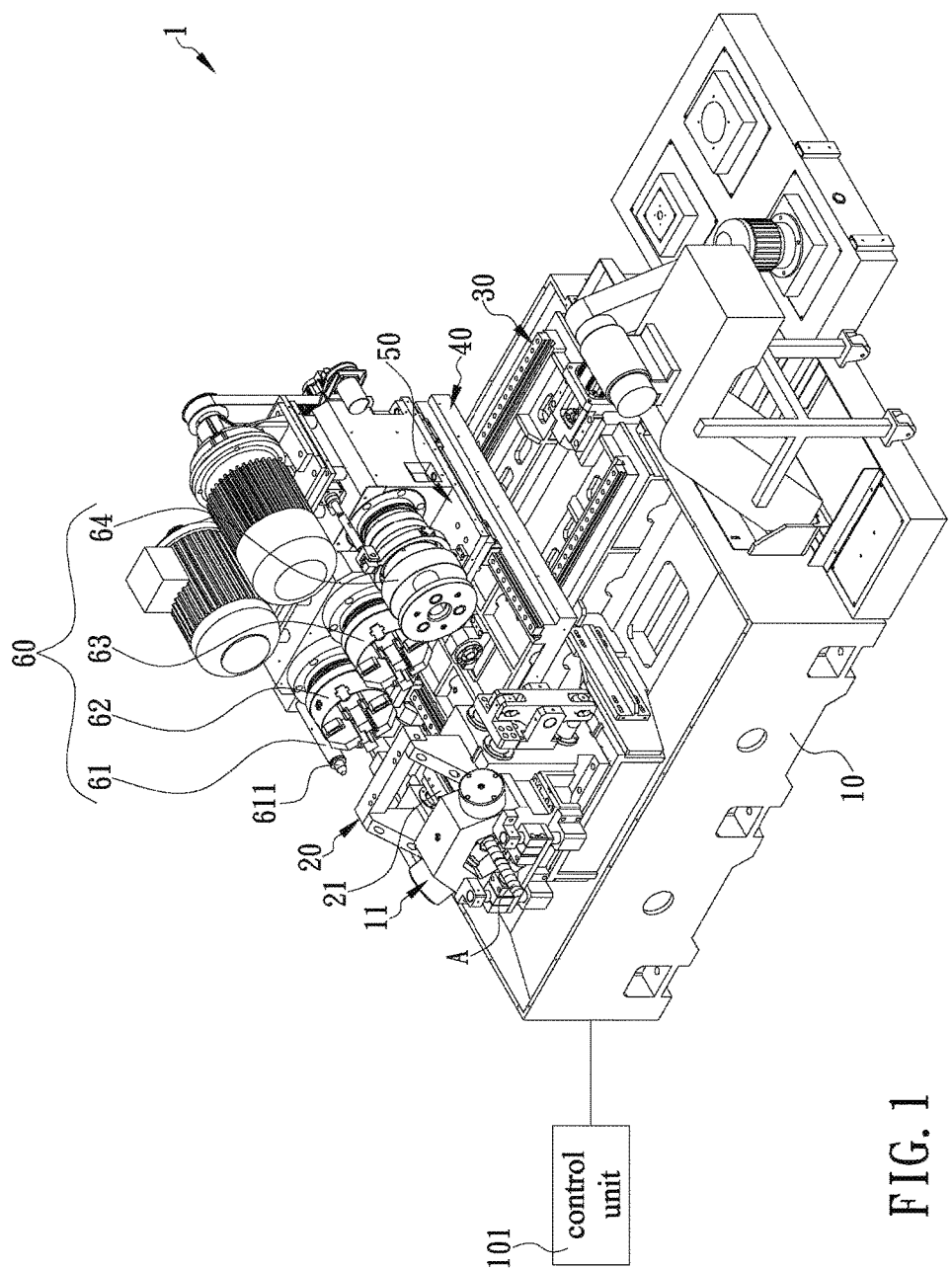
FIG. 1 is a perspective view showing the overall structure of the turning and thread-rolling machine of the present invention.
Figure 2:
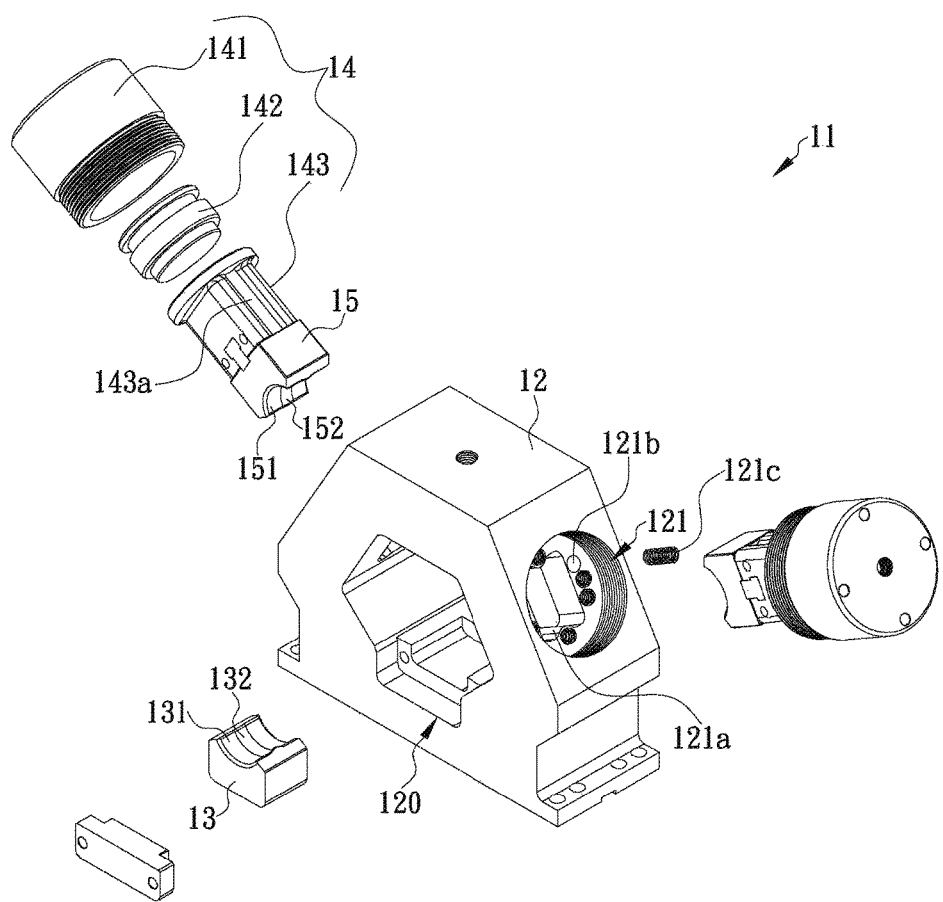
FIG. 2 is an exploded perspective view of the pre-compression device of the turning and thread-rolling machine of the present invention.
Figure 3:
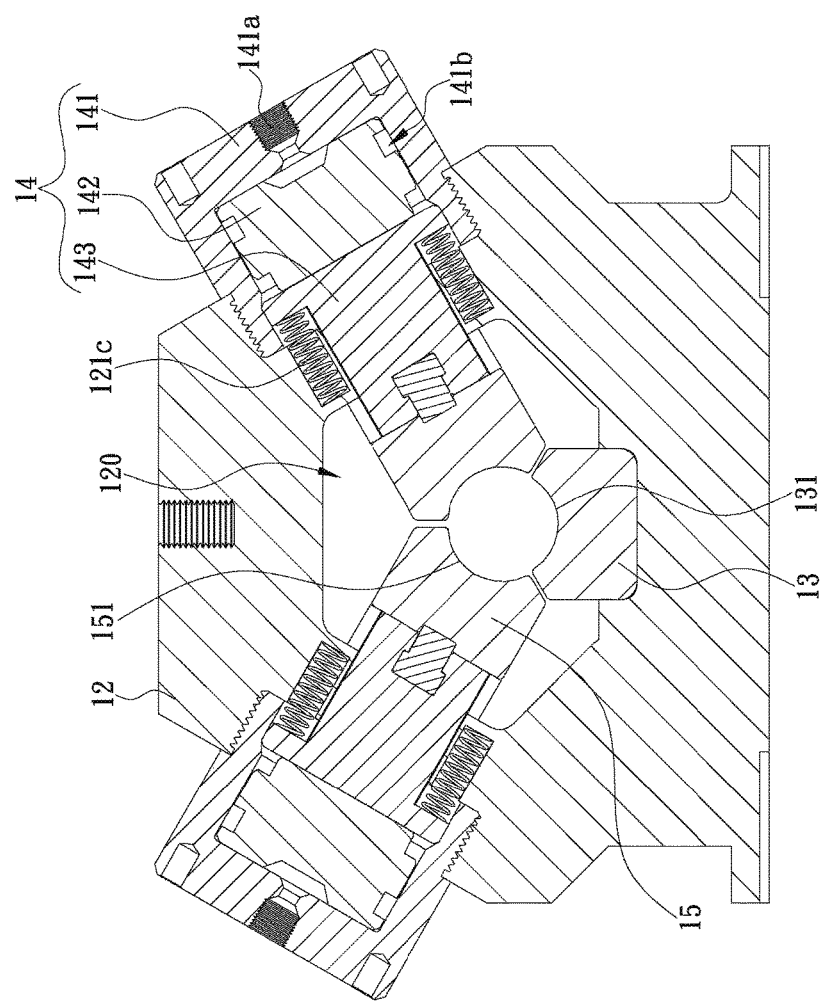
FIG. 3 is a sectional view of the pre-compression device of the turning and thread-rolling machine of the present invention.
Figure 4:
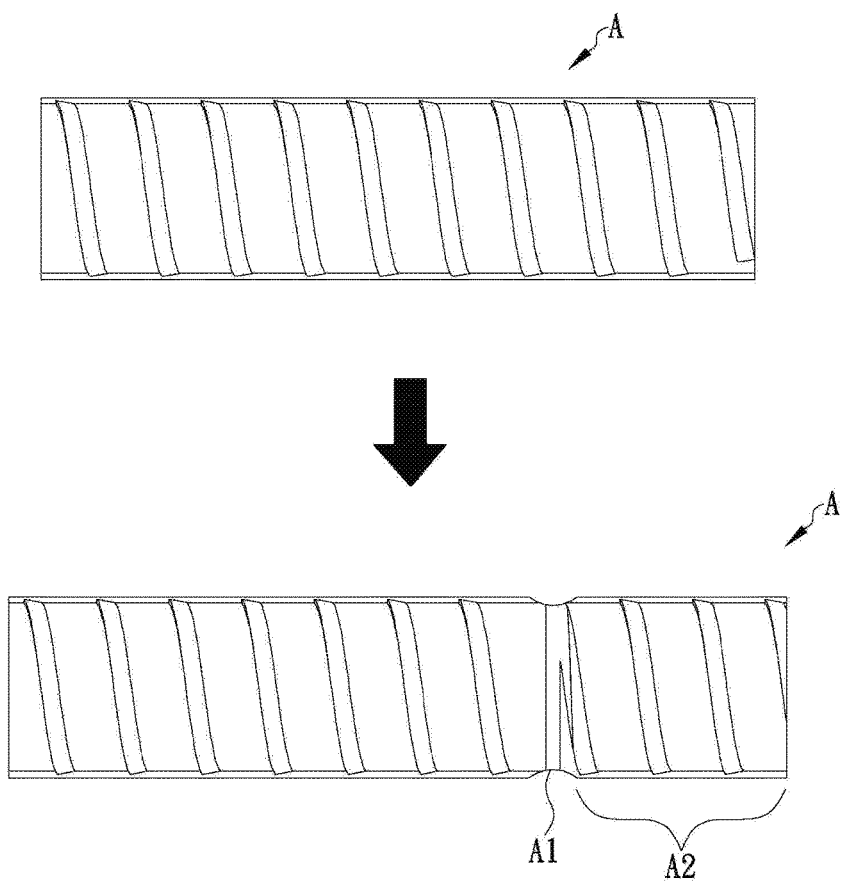
FIG. 4 and FIG. 5 show the processing procedure of the turning and thread-rolling machine of the present invention.
Figure 5:
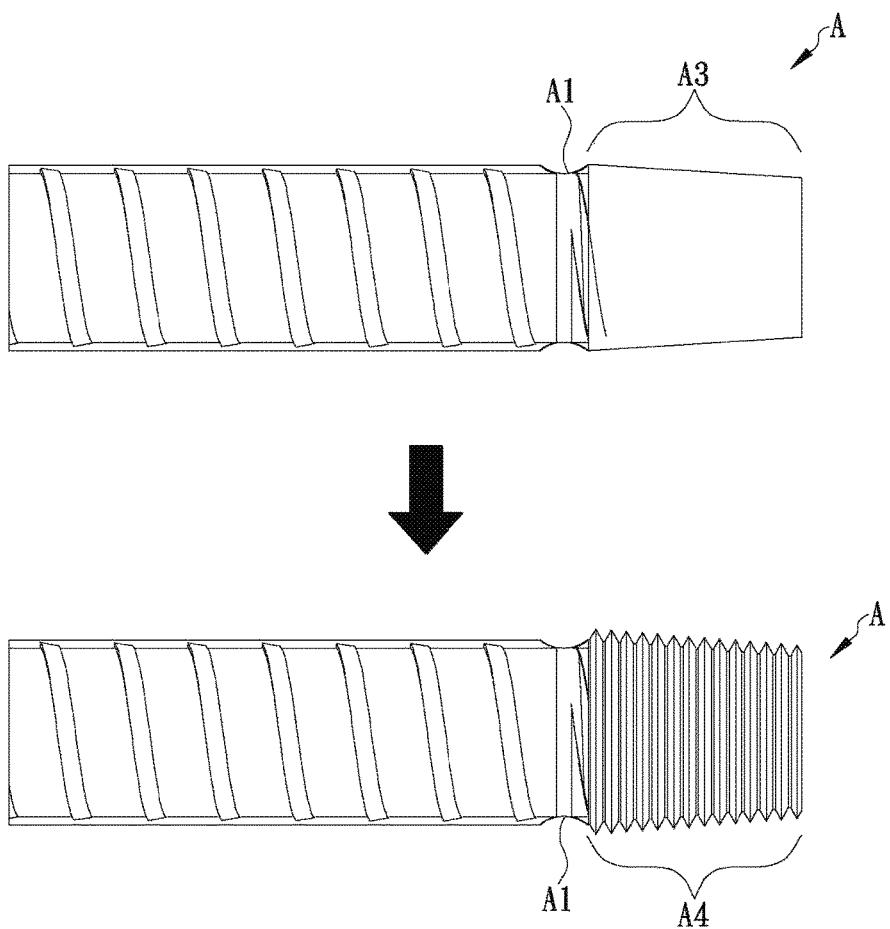

The present invention provides a turning and thread-rolling machine that has a pre-compression device. Referring to FIG. 1, the turning and thread-rolling machine 1 includes a fixing base 10, a pre-compression device 11, a fixing mechanism 20, a guiding base 30, a processing mechanism assembly 60, and a control unit 101. The fixing base 10 is the base of the turning and thread-rolling machine 1 and has its bottom side fixed on a flat surface. To facilitate identification of the relative positions of the various mechanisms, the direction facing the lower left corner of FIG. 1 is defined as the front direction, and that facing the upper right corner, as the rear direction.

Referring to FIG. 1 to FIG. 4, the pre-compression device 11 includes a pre-compression structure 12, a carrier 13, and at least two driving devices 14. The pre-compression structure 12 is provided on the fixing base 10 at a position adjacent to the front end of the fixing base 10. A cold-rolling opening 120 penetrates the pre-compression structure 12, opens at both the front and rear ends of the pre-compression structure 12, and has a far larger diameter than an unprocessed rebar A so that the unprocessed rebar A can extend through the cold-rolling opening 120. At least two mounting grooves 121 are formed in the pre-compression structure 12 along the radial direction of the pre-compression structure 12 and are equally angularly spaced from each other. Each mounting groove 121 has one end (hereinafter referred to as the first end) exposed on the outer periphery of the pre-compression structure 12 and the opposite end in communication with the cold-rolling opening 120. The wall of each mounting groove 121 is provided with a guiding portion 121a (e.g., a guide rail or guide groove).

The carrier 13 is fixedly provided on the pre-compression structure 12 and is exposed at a bottom portion of the cold-rolling opening 120. The top portion of the carrier 13 is formed with a carrying groove 131. When an end of the unprocessed rebar A extends through the cold-rolling opening 120, a portion of the unprocessed rebar A that is adjacent to that end can be positioned in the carrying groove 131. The two driving devices 14 are mounted in the mounting grooves 121 respectively. Each driving device 14 has one end provided with a cold-rolling head 15. Each driving device 14 also has a portion corresponding to one of the guiding portions 121a and provided with a guide rail portion 143a. Each guide rail portion 143a is movably engageable in the corresponding guiding portion 121a in order for the corresponding driving device 14 to push the corresponding cold-rolling head 15 along the corresponding guiding portion 121a and thereby displace the corresponding cold-rolling head 15 toward the center of the cold-rolling opening 120.

Each cold-rolling head 15 is formed with a forming groove 151, and the contours of the forming grooves 151 and of the carrying groove 131 can join together to form a circular compression space therebetween, wherein the diameter of the compression space is smaller than that of the unprocessed rebar A. Once the unprocessed rebar A is positioned in the cold-rolling opening 120, the driving devices 14 can push the cold-rolling heads 15 toward the center of the cold-rolling opening 120 and apply pressure to the unprocessed rebar A through the cold-rolling heads 15 and the carrier 13, thereby carrying out a "pre-compression operation". As a result, a pre-compressed annular groove A1 is formed in the portion of the unprocessed rebar A that is adjacent to the aforesaid end thereof, and a to-be-processed portion A2 is formed between the end of the unprocessed rebar A and the pre-compressed annular groove A1.

In this embodiment, the wall of each forming groove 151 is protrudingly provided with a pre-compression flange 152 that extends in the radial direction of the compression space, and the wall of the carrying groove 131 is protrudingly provided with a carrying flange 132 that also extends in the radial direction of the compression space. The curved contours of the pre-compression flanges 152 and of the carrying flange 132 are parallel to those of the forming grooves 151 and of the carrying groove 131, and the widths of the pre-compression flanges 152 and of the carrying flange 132 are smaller than those of the forming grooves 151 and of the carrying groove 131, in order for the pre-compression flanges 152 and the carrying flange 132 to form the pre-compressed annular groove A1 in the unprocessed rebar A by compression. The protruding heights of the pre-compression flanges 152 and of the carrying flange 132 (i.e., the depth of the pre-compressed annular groove A1) range from 5 mm to 20 mm, preferably from 10 mm to 15 mm.

The fixing mechanism 20 is locked on the fixing base 10 at a position corresponding to the rear end of the pre-compression device 11 and is provided with two clamping jaws 21. The clamping jaws 21 are each formed with a fixing groove in order to clamp the rebar A after the "pre-compression operation" is completed (the timing of clamping will be detailed below). The guiding base 30 has its bottom side locked on the fixing base 10 at a position corresponding to the rear end of the fixing mechanism 20 and is provided with a transverse translation mechanism 40 and a longitudinal translation mechanism 50.

The processing mechanism assembly 60 is locked on the top side of the guiding base 30 so as to be displaced by the transverse translation mechanism 40 and the longitudinal translation mechanism 50. The processing mechanism assembly 60 is transversely provided with a starting mechanism 61, a turning mechanism (i.e., the first turning device 62 and the second turning device 63 shown in FIG. 1), and a thread-rolling mechanism 64. The front end of the starting mechanism 61 is provided with a position detection rod 611.

Referring to FIG. 1 to FIG. 5, the control unit 101, which may be provided in the fixing base 10 or as an external controller, is separately and electrically connected with the pre-compression device 11, the fixing mechanism 20, the transverse translation mechanism 40, the longitudinal translation mechanism 50, and the processing mechanism assembly 60 in order to drive the pre-compression device 11 to perform the pre-compression operation and the processing mechanism assembly 60 to perform a turning operation and a thread-rolling operation. The following paragraphs detail how the turning and thread-rolling machine 1 of the present invention works.

(1) Pre-compression operation: To begin with, a portion of an unprocessed rebar A that is adjacent to the end thereof intended for coupling is inserted into the cold-rolling opening 120 and placed on the wall of the carrying groove 131. Then, the control unit 101 drives the driving devices 14 at the same time to displace the cold-rolling heads 15 toward the center of the cold-rolling opening 120. Consequently, the cold-rolling heads 15 and the carrier 13 apply pressure to the unprocessed rebar A to form the pre-compressed annular groove A1 and the to-be-processed portion A2 between the end of the unprocessed rebar A and the pre-compressed annular groove A1.

(2) Positioning operation: The end of the rebar A is further inserted into a space above the guiding base 30 when the "pre-compression operation" is completed. Once the rebar A is pressed against the position detection rod 611, the starting mechanism 61 generates a starting signal to the control unit 101, and the control unit 101 drives the fixing mechanism 20 in response in order to clamp the rebar A between the fixing grooves of the clamping jaws 21.

(3) Turning operation: The control unit 101 drives the transverse translation mechanism 40 and the longitudinal translation mechanism 50 so that the first turning device 62 and the second turning device 63 are sequentially displaced to the to-be-processed portion A2 to turn the to-be-processed portion A2 one after the other (i.e., to perform a first turning and a second turning respectively, in succession). The goal is to process the to-be-processed portion A2 into a smooth tapered end A3 (or a columnar end). In this embodiment, less material is removed from the to-be-processed portion A2 by the second turning than by the first turning.

(4) Thread-rolling operation: After the turning operation, the control unit 101 further drives the transverse translation mechanism 40 and the longitudinal translation mechanism 50 so that the thread-rolling mechanism 64 is displaced to a position corresponding to the tapered end A3 and can begin thread rolling. In this embodiment, referring to FIG. 7, the thread-rolling mechanism 64 is configured to perform both expanding and thread rolling (e.g., compressing the rebar A with transversely hot- or cold-forging dies to expand the cross section of the to-be-processed portion A2 (tapered end A3) by 15% to 18% and then thread-rolling the expanded portion). The tapered end A3 is expanded before it is processed by three thread-rolling dies 641 (which are driven by a driving motor, not shown) into a coupling end. The foregoing process helps increase the structural strength of the coupling end.

As the turning and thread-rolling machine 1 is designed to cold-roll only an annular portion, but not the entire end section, of the unprocessed rebar A, the pre-compression device 11 can have a compact configuration and be directly integrated with the fixing base 10, allowing the turning and thread-rolling machine 1, as a single apparatus, to automatically and sequentially complete three different operations (i.e., pre-compression, turning, and thread rolling), making the processing procedure simpler and more intuitive than in the prior art.

Besides, the pre-compressed annular groove A1 provides "ease of inspection" because its position may be set according to the specifications of the rebar A, thus enabling the quality control personnel at a construction site to visually identify the specifications of different rebars A with ease. Moreover, when the turning and thread-rolling machine 1 performs thread-rolling on the tapered end A3 of the rebar A, the pre-compressed annular groove A1 indicates the end of the to-be-processed portion A2 so that the thread-rolling operation can be terminated as soon as the thread-rolling dies reach the pre-compressed annular groove A1 and start idling. This effectively prevents the thread-rolling dies from excessive displacement, which may lead to damage by contact with the protruding ribs on the rebar A.

Figure 6A:
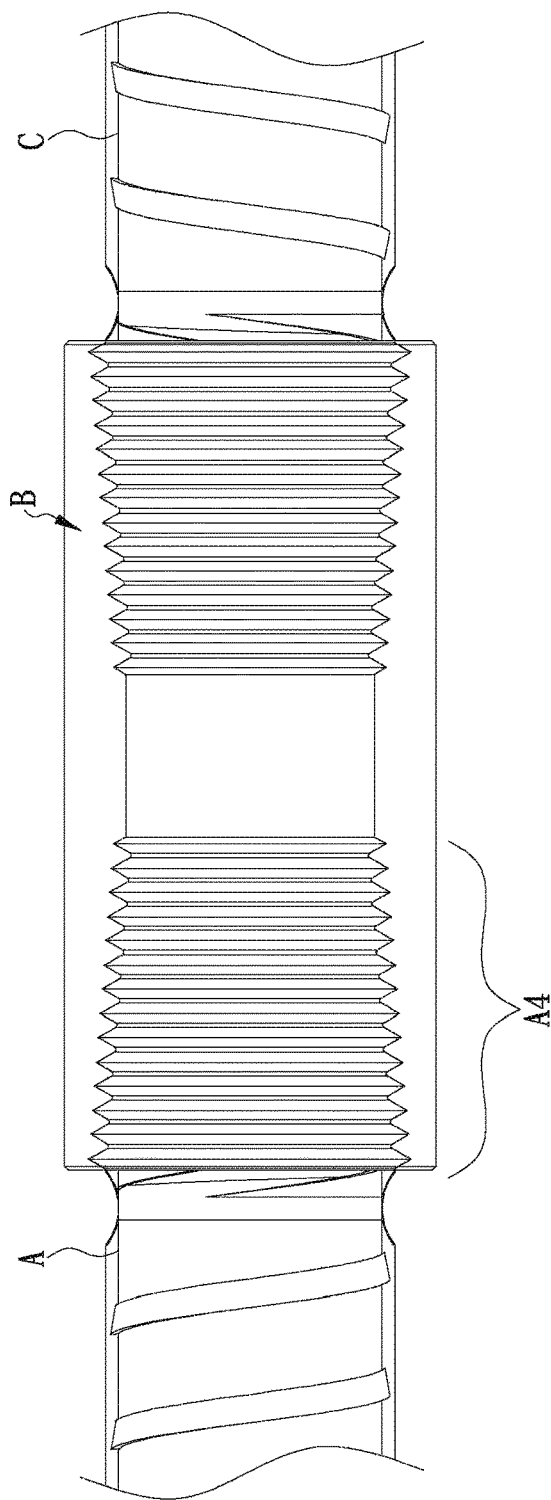
FIG. 6A and FIG. 6B schematically show two different mechanical rebar couplers.
Figure 6B:
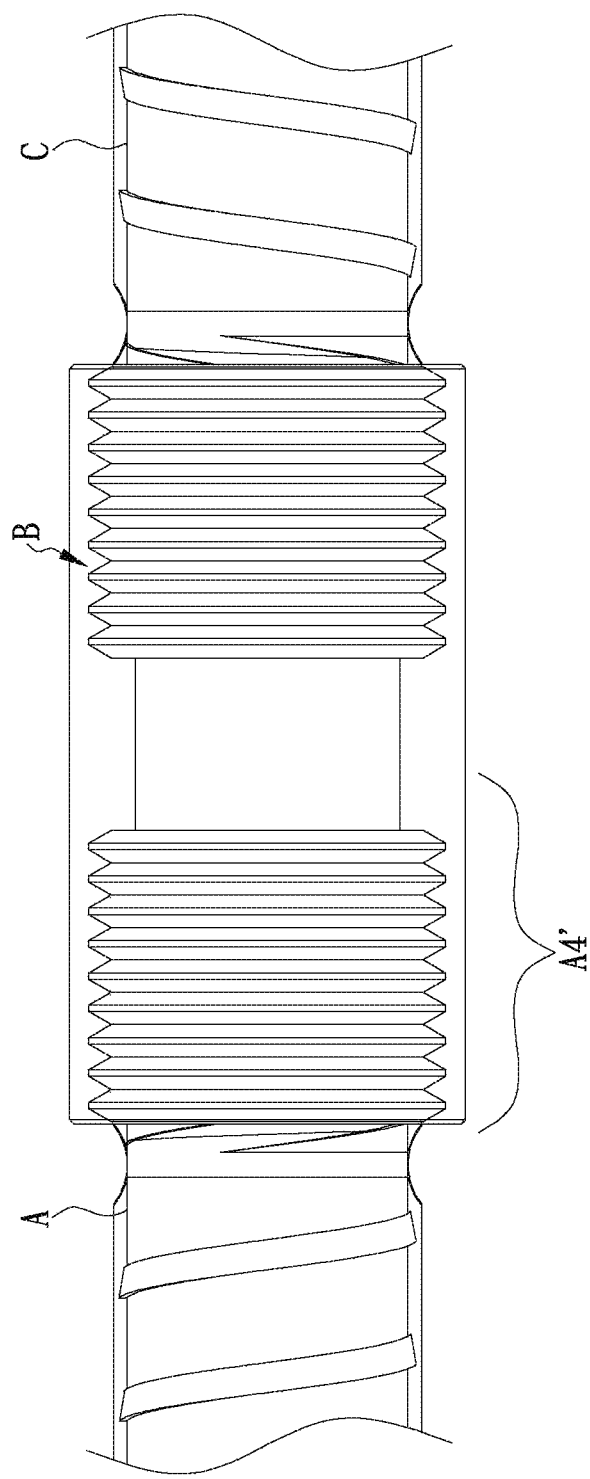

As referring to FIG. 6A and FIG. 6B in conjunction with FIG. 1, after the turning and thread-rolling machine 1 of this invention has finished the turning and thread-rolling processes with respect to the rebar A, a coupling end is formed at one end of the rebar A (i.e. the turning and thread-rolling machine 1 is capable of processing the rebar A into having a tapered end A4 or a straight end A4' as shown in FIGS. 6A and 6B, respectively), and can be threadedly connected with a mechanical rebar coupler B and thereby connected with another rebar C. According to the torsion and tensile tests conducted by the inventor of the present invention on the rebars A and C after they were processed by the turning and thread-rolling machine 1 and coupled with the mechanical rebar coupler B, both of the rebars A and C broke in their middle sections, rather than within the mechanical rebar coupler B, when subjected to torsion/tension that exceeded their loading capacities. The test results show that the coupled portion of the rebars A and C was stronger than the middle sections of the rebars A and C, which meets construction requirements absolutely.

The mechanisms of the turning and thread-rolling machine 1 are described in more detail below. In the embodiment shown in FIG. 1 to FIG. 3, each mounting groove 121 has a larger diameter at one end than at the opposite end such that a step is formed on the groove wall. Each step is provided with at least one positioning hole 121b in which a restoring spring 121c is mounted, and each restoring spring 121c extends out of the corresponding positioning hole 121b when unloaded. The driving devices 14 are hydraulic devices and each include a cylinder jacket 141, a hydraulic piston 142, and a pushing arm 143. Each cylinder jacket 141 is locked at the first end of the corresponding mounting groove 121 and has one end facing away from the cold-rolling opening 120 and provided with an oil inlet 141a and the opposite end concavely provided with a hydraulic compression space 141b.

Each hydraulic piston 142 is movably positioned in the corresponding hydraulic compression space 141b. Each pushing arm 143 has a portion adjacent to one end thereof and extending into the corresponding hydraulic compression space 141b while the opposite end (hereinafter the second end) of the pushing arm 142 is connected with the corresponding cold-rolling head 15. Each pushing arm 143 is configured to be pressed against the restoring spring 121c in the wall of the corresponding mounting groove 121 and is provided with the corresponding guide rail portion 143a at a position corresponding to the guide portion 121a of the corresponding mounting groove 121. When a hydraulic oil is injected into the hydraulic compression spaces 141b through the respective oil inlets 141a, the hydraulic pistons 142 drive the second ends of the pushing arms 143 respectively to push the cold-rolling heads 15 toward the center of the cold-rolling opening 120, in order to perform the pre-compression operation. Once pre-compression is completed, the restoring springs 121c push the first ends of the pushing arms 143 respectively to retract the cold-rolling heads 15 away from the center of the cold-rolling opening 120.

Figure 8:
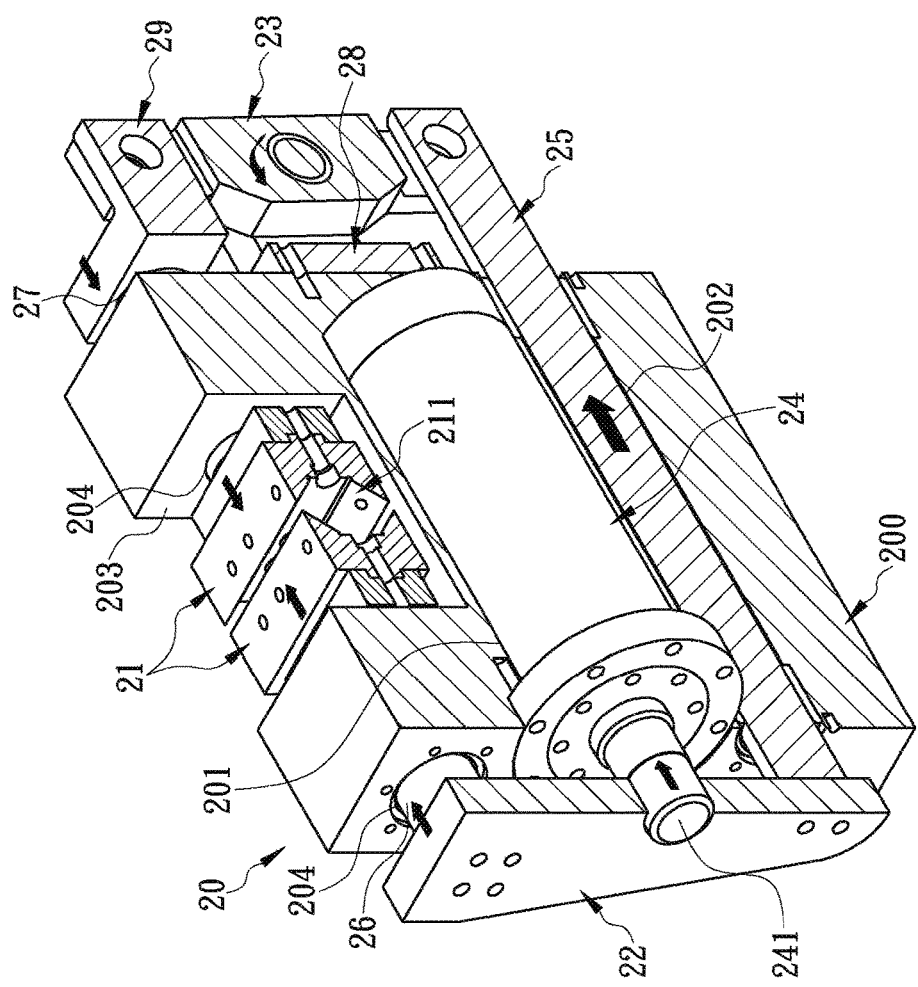
FIG. 8 is a sectional view of the fixing mechanism of the present invention.
Figure 9:
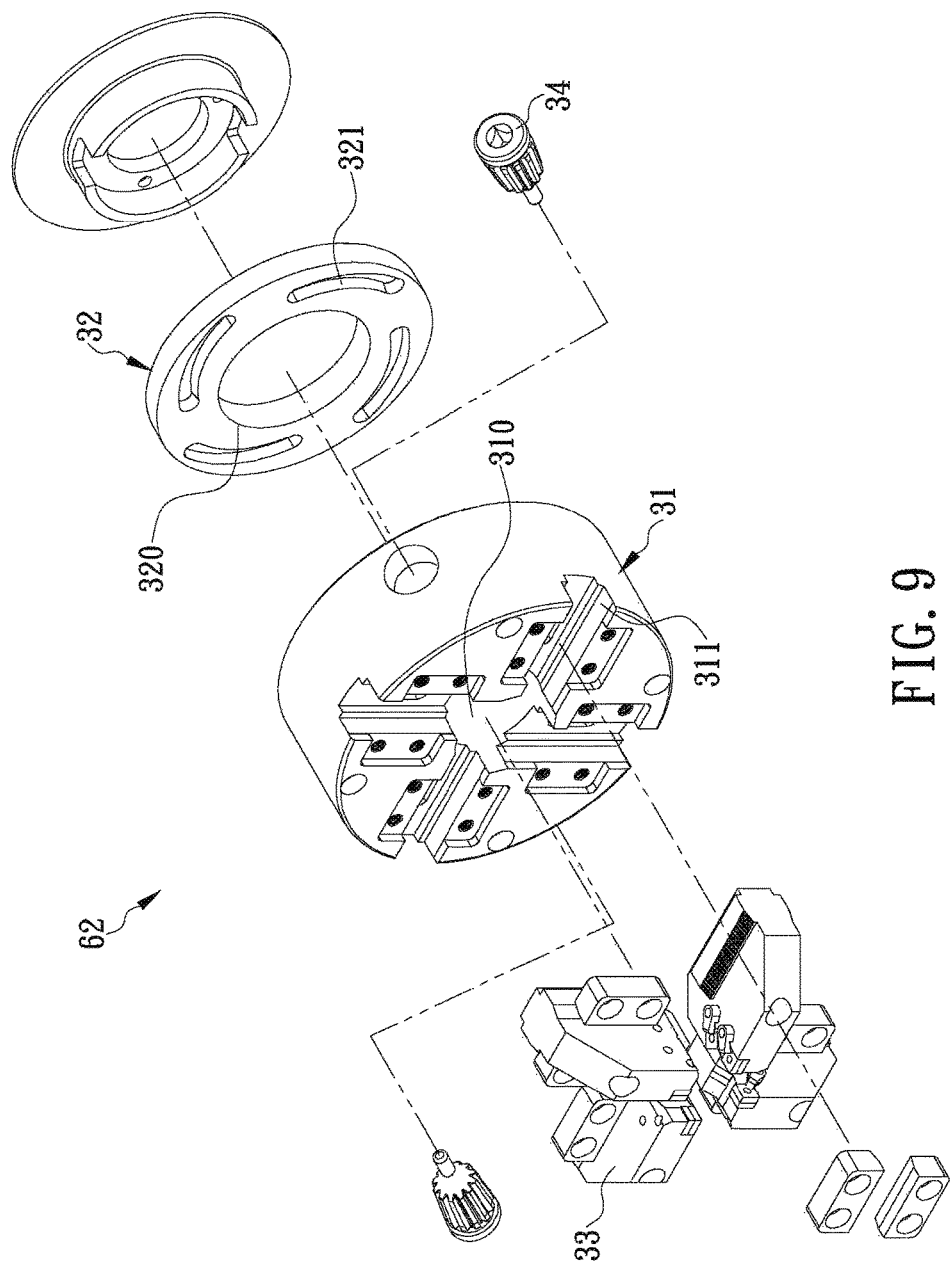
FIG. 9 is an exploded perspective view of a turning mechanism of the present invention.
Figure 10:
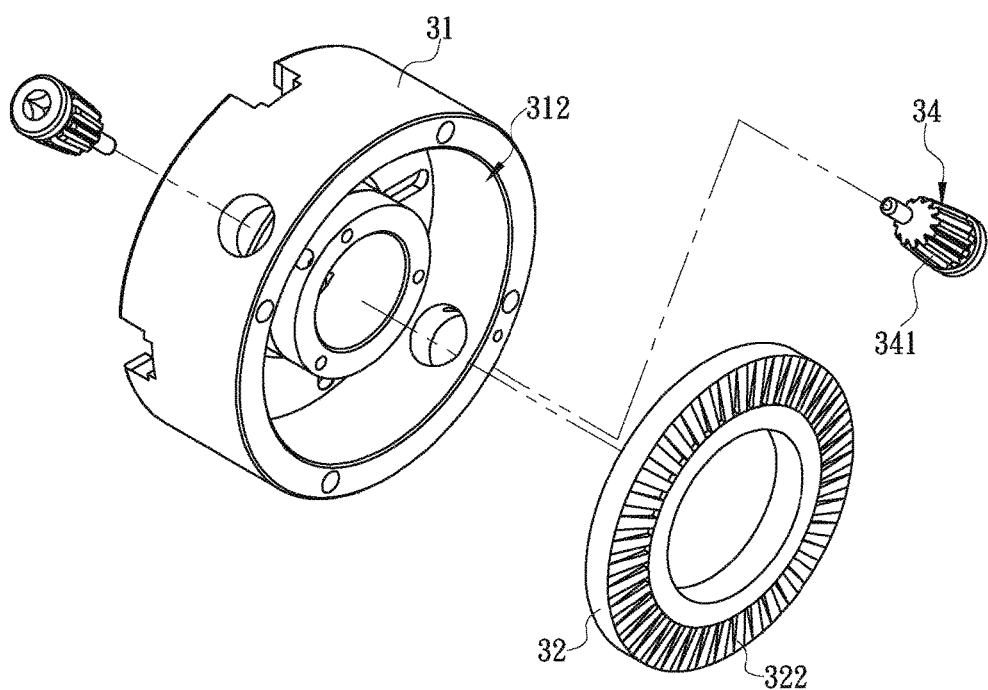
FIG. 10 is another exploded perspective view of the turning mechanism in FIG. 9.
Figure 11:
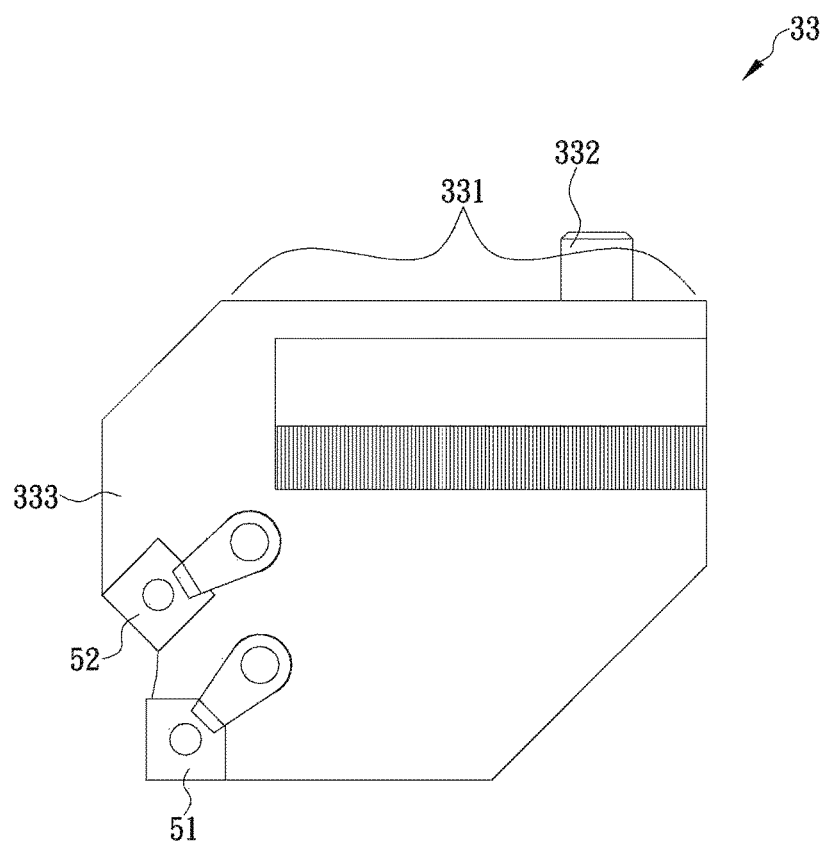
FIG. 11 schematically shows a turret of the first turning device of the present invention.
Figure 12A:
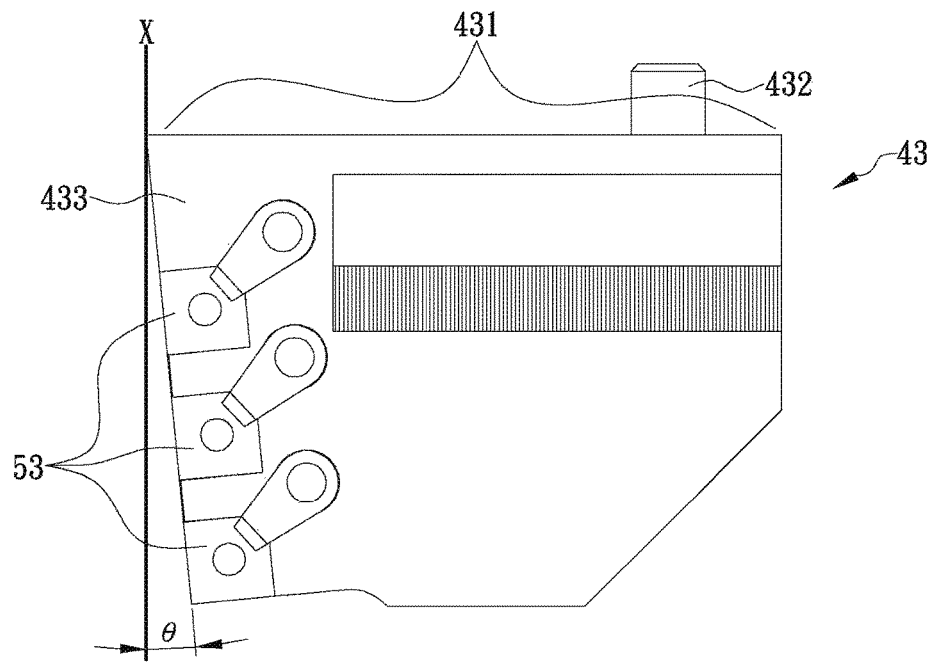
FIG. 12A and FIG. 12B schematically show two turrets of the second turning device of the present invention.
Figure 12B:
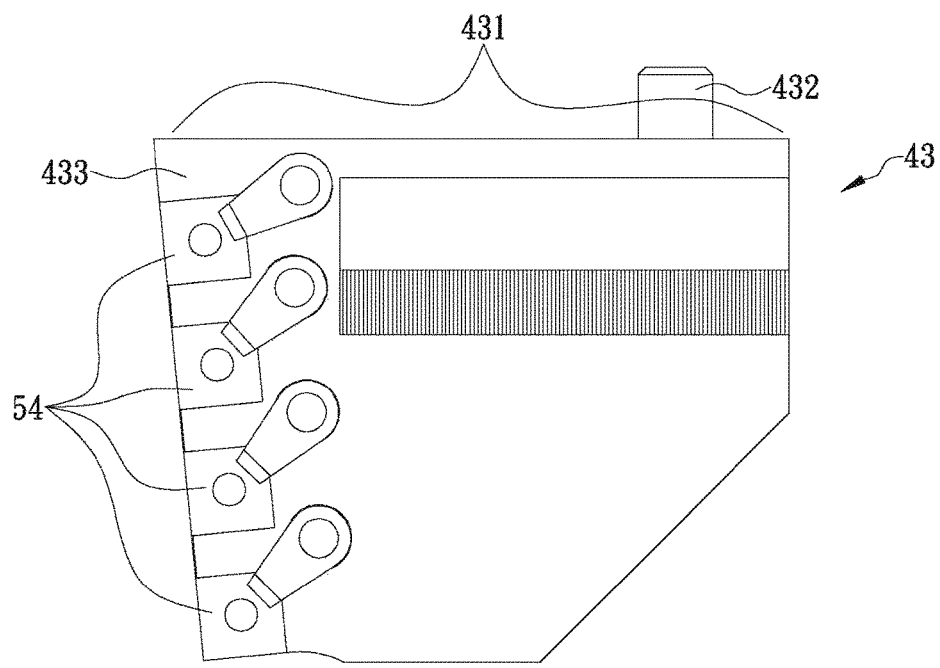

The structure of the fixing mechanism 20 is now detailed with reference to FIG. 8 in conjunction with FIG. 1. The fixing mechanism 20 includes a positioning block 200, a translation plate 22, and a linking plate 23. The positioning block 200 is transversely formed therein with an internal groove 201 adjacent to a central portion of the positioning block 200. A hydraulic jack 24 is fixedly provided in the internal groove 201 and has a plunger 241. The plunger 241 has one end (hereinafter the first end) provided in the hydraulic jack 24 and the opposite end (hereinafter the second end) jutting out of the hydraulic jack 24 and exposed on one side of the positioning block 200. The hydraulic jack 24 is configured to apply a pushing or pulling force to the first end of the plunger 241 so as to displace the second end of the plunger 241.

In addition, the positioning block 200 is transversely provided therein with a through hole 202 adjacent to the bottom portion of the positioning block 200. A connecting member 25 is movably mounted in the through hole 202 and has two ends exposed on two opposite sides of the positioning block 200 respectively. The top side of the positioning block 200 is concavely provided with a receiving groove 203. Also, the positioning block 200 is transversely provided therein with at least two guide holes 204 adjacent to the top portion of the positioning block 200. The two guide holes 204 are aligned along the same centerline, and the corresponding ends of the two guide holes 204 are in communication with the receiving groove 203. A first positioning rod 26 and a second positioning rod 27 are respectively and movably mounted in the two guide holes 204. Each positioning rod 26 or 27 has one end exposed in the receiving groove 203 and connected with one of the clamping jaws 21. The other end (hereinafter the second end) of each positioning rod 26 or 27 is exposed on one of the two opposite sides of the positioning block 200. The positioning rods 26 and 27 are parallel to the plunger 241 and the connecting member 25.

The translation plate 22 is fixedly connected, in a top-to-bottom order, with the second end of the first positioning rod 26, the second end of the plunger 241, and the connecting member 25 so as to displace the first positioning rod 26 and the connecting member 25 simultaneously when the plunger 241 is displaced. The linking plate 23, on the other hand, is pivotally connected, in a top-to-bottom order, with the second end of the second positioning rod 27, the positioning block 200, and the connecting member 25. When the first positioning rod 26 and the connecting member 25 are displaced, the linking plate 23 drives the second positioning rod 27 to displace in the opposite direction, thereby driving the clamping jaws 21 on the positioning rods 26 and 27 to clamp or release the unprocessed rebar A (through the fixing grooves 211 on the clamping jaws 21). As the fixing mechanism 20 requires only one hydraulic jack 24, and the hydraulic jack 24 is provided within, rather than outside, the positioning block 200, the fixing mechanism 20 itself does not take up too much space, nor does the hydraulic jack 24 occupy any extra space outside the fixing mechanism 20.

In this embodiment, the fixing mechanism 20 further includes a pivotal connection member 28 and at least one adapting member 29. The pivotal connection member 28 has one side fixed to an outer peripheral side of the fixing block 200 at a position adjacent to a central portion of the outer peripheral side. The opposite side of the pivotal connection member 28 is pivotally connected to the linking plate 23 at a position adjacent to a central portion of the linking plate 23. The adapting member 29 has one side fixed to the second end of the second positioning rod 27 and the opposite side pivotally connected to the linking plate 23 at a position adjacent to the top portion of the linking plate 23.

The structural details of the turning mechanism are given below with reference to FIG. 1, FIG. 4 and FIG. 9 to FIG. 11. The first turning device 62 includes a main body 31, a driving disk 32, and a plurality of turrets 33 (the second turning device 63 has substantially the same structure as the first turning device 62). The main body 31 is penetrated by a through groove 310 that extends in the axial direction of the main body 31. In addition, the main body 31 has a front side provided with a plurality of rail grooves 311 that extend in the radial direction of the main body 31. Each rail groove 311 has one end adjacent to the outer periphery of the main body 31 and the opposite end perpendicularly connected to the through groove 310. The rear side of the main body 31 is provided with an assembly groove 312 in communication with the through groove 310 and the rail grooves 311.

The configuration of the driving disk 32 matches that of the assembly groove 312 so that the driving disk 32 can be positioned and rotated in the assembly groove 312. The front side of the driving disk 32 is formed with a plurality of guiding grooves 321. The guiding grooves 321 are curved and each have one end adjacent to the outer periphery of the driving disk 32 and the opposite end adjacent to the center of the driving disk 32. Each turret 33 has a rear end provided with a rail portion 331 whose configuration matches that of each rail groove 311. The rear end of each turret 33 is further protrudingly provided with an engaging portion 332. When each rail portion 331 is engaged in the corresponding rail groove 311, the corresponding engaging portion 332 extends through the corresponding rail groove 311 and is engaged in the corresponding guiding groove 321. The front end of each rail portion 331 is provided with a turning cutter mount 333 that extends in the axial direction of the main body 31. Each turning cutter mount 333 is provided with a plurality of turning cutters 51 and 52. When rotated, the driving disk 32 drives the turrets 33, which are connected with the driving disk 32 via the engaging portions 332, simultaneously so that the turrets 33 are displaced respectively along the rail grooves 311 toward the through groove 310 until the distance between the turrets 33 matches the configuration of the to-be-processed portion A2.

The rear side of the driving disk 32 is provided with a plurality of first teeth 322 that extend in the radial direction of the driving disk 32, and the outer periphery of the main body 31 is pivotally provided with at least one adjustment element 34. The adjustment element 34 has one end exposed on the outer periphery of the main body 31 and the opposite end extending into the assembly groove 312 and provided with a plurality of second teeth 341. The second teeth 341 correspond in position to the first teeth 322 in order to mesh with the first teeth 322. Thus, the driving disk 32 can be rotated by rotating the adjustment element 34.

As shown in FIG. 1, FIG. 4, and FIG. 9 to FIG. 11, the first turning device 62 and the second turning device 63 have the same structure except for the way the turrets and the turning cutters are arranged. The first turning device 62 is configured for "rough machining" while the second turning device 63 is configured for "finishing"; that is to say, less material is removed by the second turning than by the first turning. Each turning cutter mount 333 of the first turning device 62 is provided with a first turning cutter 51 adjacent to the front end of the mount and a second turning cutter 52 adjacent to the rear end of the mount, wherein the second turning cutter 52 is closer to the through groove 310 than the first turning cutter 51. The first turning device 62 uses the first turning cutters 51 and the second turning cutters 52 to chamfer, and to remove excessive lateral material from, the to-be-processed portion A2 respectively.

Referring to FIG. 1, FIG. 4, FIG. 5, FIG. 12A, and FIG. 12B, the second turning device 63 is provided with a total of four turrets 43 (each of which also has a rail portion 431, an engaging portion 432, and a turning cutter mount 433). The turrets 43 are arranged in pairs along a vertical direction and a horizontal direction respectively. The third turning cutters 53 on the pair of turrets 43 that are arranged in one of the vertical direction and the horizontal direction are offset from the fourth turning cutters 54 on the pair of turrets 43 that are arranged in the other of the vertical direction and the horizontal direction. In this embodiment, each turning cutter mount 433 of the second turning device 63 has an inclined side facing the through groove 310, wherein the inclined side forms an inclination angle θ with the axial direction X of the main body 31 in order for the turning cutters 53 and 54 to turn the to-be-processed portion A2 into the tapered end A3. When processing other types of rebars, however, each turning cutter mount 433 of the second turning device 63 may have a straight side (i.e., with the inclination angle θ being zero) facing the through groove 310.

The embodiment described above is but a preferred one of the present invention and does not impose limitation on the technical features of the invention. All equivalent changes based on the technical contents disclosed herein and readily conceivable by a person of ordinary skill in the art should fall within the scope of the present invention.

What is claimed is:

1. A turning and thread-rolling machine with a pre-compression device, the turning and thread-rolling machine, comprising:
    a fixing base having a top side and a bottom side, the bottom side being fixed on a flat surface; the pre-compression device comprising:
        a pre-compression structure provided on the top side of the fixing base at a position adjacent to a first end of the fixing base, wherein the pre-compression structure is penetrated by a cold-rolling opening that opens at both a first end and an opposing second end of the pre-compression structure, the pre-compression structure is formed with at least two mounting grooves that extend in respective radial directions with respect to a longitudinal axis of the pre-compression structure and are equally angularly spaced from each other, each of said at least two mounting grooves has a first end exposed on an outer periphery of the pre-compression structure and an opposite second end in communication with the cold-rolling opening, and each of said at least two mounting grooves has a respective wall provided with a guiding portion;
        a carrier fixedly provided on the pre-compression structure and exposed in the cold-rolling opening, wherein the carrier has at top portion formed with a carrying groove; and
        at least two driving devices mounted in respective ones of the at least two mounting grooves, wherein each of said at least two driving devices has a respective end provided with a cold-rolling head and is configured to push the cold-rolling head thereof along a corresponding one of the guiding portions so that the cold-rolling head thereof is displaced toward a center of the cold-rolling opening, each cold-rolling head being formed with a respective forming groove, and contours of the respective forming grooves and a contour of the carrying groove are able to join together to form a compression space there between, and the compression space has a smaller diameter than an unprocessed reinforcing bar;
    a fixing mechanism locked on the top side of the fixing base at a position corresponding to the second end of the pre-compression device, wherein the fixing mechanism is provided with a first end, an opposing second end, and two clamping jaws;
    a guiding base having a top side and a bottom side, the bottom side being locked on the top side of the fixing base at a position corresponding to the second end of the fixing mechanism, wherein the guiding base is provided with a transverse translation mechanism and a longitudinal translation mechanism;
    a processing mechanism assembly locked on the top side of the guiding base and transversely provided with a starting mechanism, a turning mechanism, and a thread-rolling mechanism, wherein the starting mechanism has a first end provided with a position detection rod; and
    a control unit separately and electrically connected to each of the pre-compression device, the fixing mechanism, the transverse translation mechanism, the longitudinal translation mechanism, and the processing mechanism assembly, wherein when a portion of the unprocessed reinforcing bar that is adjacent to an end thereof extends into the cold-rolling opening and is placed on a wall of the carrying groove, the control unit drives the at least two driving devices to displace the respective cold-rolling heads thereof simultaneously toward the center of the cold-rolling opening, in order for the respective cold-rolling heads and the carrier to apply pressure to the unprocessed reinforcing bar and thereby form both a pre-compressed annular groove in the portion of the unprocessed reinforcing bar that is adjacent to the end thereof and a to-be-processed portion between the end of the unprocessed reinforcing bar and the pre-compressed annular groove; and when the end of the unprocessed reinforcing bar further extends into a space above the guiding base and is pressed against the position detection rod, the control unit drives the fixing mechanism to clamp the unprocessed reinforcing bar and also drives the transverse translation mechanism and the longitudinal translation mechanism so that the turning mechanism and the thread-rolling mechanism are sequentially displaced to a position corresponding to the to-be-processed portion to perform turning and thread rolling respectively, thereby processing the to-be-processed portion into a coupling end.

2. The turning and thread-rolling machine of claim 1, wherein each of the respective forming grooves has a corresponding wall that is protrudingly provided with a pre-compression flange that extends in a radial direction with respect to a longitudinal axis of the compression space, the wall of the carrying groove being protrudingly provided with a carrying flange also extends in a respective radial direction of the compression space, and the pre-compression device uses the pre-compression flanges and the carrying flange to compress the unprocessed reinforcing bar and thereby form the pre-compressed annular groove.

3. The turning and thread-rolling machine of claim 2, wherein each of the pre-compression flanges and the carrying flange has a respective protruding height ranging from 5 mm to 20 mm.

4. The turning and thread-rolling machine of claim 3, wherein the respective protruding heights of the pre-compression flanges and the carrying flange from 10 mm to 15 mm.

5. The turning and thread-rolling machine of claim 4, wherein each of the at least two driving devices comprises:
a cylinder jacket locked at the first end of the corresponding mounting groove of the at least two mounting grooves, wherein the cylinder jacket has a first end facing away from the cold-rolling opening and provided with an oil inlet, and an opposite second end concavely provided with a hydraulic compression space;
a hydraulic piston movably positioned in the hydraulic compression space; and
a pushing arm, wherein a portion of the pushing arm that is adjacent to a first end thereof extends into the hydraulic compression space, an opposite second end of the pushing arm is connected with a corresponding one of the cold-rolling heads, and the pushing arm is configured to be pressed against a restoring spring in the wall of the corresponding mounting groove and has a portion corresponding to one of the guiding portions and provided with a guide rail portion so that, when a hydraulic oil is injected into the hydraulic compression space, the pushing arm is driven by the hydraulic piston in order for the second end of the pushing arm to push the corresponding cold-rolling head toward the center of the cold-rolling opening, and when the hydraulic oil is drawn out of the hydraulic compression space, the restoring spring pushes the first end of the pushing arm and thereby retract the corresponding cold-rolling head from the center of the cold-rolling opening.

6. The turning and thread-rolling machine of claim 5, wherein the turning mechanism comprises a first turning device and a second turning device, the first turning device and the second turning device are configured to perform a first turning and a second turning on the to-be-processed portion of the unprocessed reinforcing bar sequentially, and less material is removed by the second turning than by the first turning.

7. The turning and thread-rolling machine of claim 6, wherein the fixing mechanism comprises:
a positioning block transversely formed therein with an internal groove, wherein the internal groove is fixedly provided therein with a hydraulic jack, the hydraulic jack has a plunger, the plunger has a first end provided in the hydraulic jack and an opposite second end jutting out of the hydraulic jack and exposed on a side of the positioning block, the hydraulic jack is configured to apply a pushing or pulling force to the first end of the plunger and thereby displace the second end of the plunger, the positioning block is transversely provided therein with a through hole adjacent to a bottom portion of the positioning block, the through hole is movably mounted therein with a connecting member, the connecting member has two ends exposed on two opposite sides of the positioning block respectively, the positioning block has a top side concavely provided with a receiving groove, the positioning block is transversely formed therein with at least two guide holes adjacent to the top side of the positioning block, the at least two guide holes are aligned along a same centerline and have corresponding ends in communication with the receiving groove, the at least two guide holes are respectively and movably mounted therein with a first positioning rod and a second positioning rod, each of the first positioning rod and the second positioning rod has a first end exposed in the receiving groove and connected with a corresponding one of the clamping jaws and an opposite second end exposed on one of the two opposite sides of the positioning block, and the positioning rods are parallel to the plunger and the connecting member;
a translation plate fixedly connected, in a top-to-bottom order, with the second end of the first positioning rod, the second end of the plunger, and the connecting member so that, when the plunger is displaced, the translation plate drives the first positioning rod and the connecting member into simultaneous displacement; and
a linking plate pivotally connected, in a top-to-bottom order, with the second end of the second positioning rod, the positioning block, and the connecting member so that, when the first positioning rod and the connecting member are displaced, the linking plate drives the second positioning rod to displace in a reverse direction, in order for the positioning rods to clamp or release the unprocessed reinforcing bar.

8. The turning and thread-rolling machine of claim 7, wherein the fixing mechanism further comprises a pivotal connection member, the pivotal connection member has a first side fixed to an outer peripheral side of the positioning block at a position adjacent to a central portion of the outer peripheral side, and the pivotal connection member has an opposite second side pivotally connected to the linking plate at a position adjacent to a central portion of the linking plate.

9. The turning and thread-rolling machine of claim 8, wherein the fixing mechanism further comprises at least one adapting member, and the adapting member has a side fixed to the second end of the second positioning rod and an opposite side pivotally connected to the linking plate at a position adjacent to a top portion of the linking plate.

10. The turning and thread-rolling machine of claim 9, wherein each of the first turning device and the second turning device comprises:
a main body penetrated by a through groove extending in an axial direction of the main body, wherein the main body has a first side provided with a plurality of rail grooves extending in a radial direction of the main body, each of said plurality of rail grooves having an end adjacent to an outer periphery of the main body and an opposite end perpendicularly connected to the through groove, and the main body also has a second side provided with an assembly groove in communication with the through groove and the plurality of rail grooves;
a driving disk matching the assembly groove in configuration so as to be positioned and rotated in the assembly groove, wherein the driving disk has a first side formed with a plurality of guiding grooves, and the plurality of guiding grooves are curved and each has an end adjacent to an outer periphery of the driving disk and an opposite end adjacent to a central portion of the driving disk; and
a plurality of turrets each having an end provided with a respective rail portion, wherein each of the respective rail portions matches each of said plurality of rail grooves in configuration and is protrudingly provided with an engaging portion so that, when each of the respective rail portions is engaged in a corresponding one of the plurality of rail grooves, the engaging portion of each of the respective rail portions extends through the corresponding rail groove and is engaged in a corresponding one of the plurality of guiding grooves; each of the respective rail portions has an end provided with a respective turning cutter mount extending in the axial direction of the main body; each of said respective turning cutter mounts is provided with a plurality of turning cutters; and when the driving disk is driven to rotate, the plurality of turrets, which are connected with the driving disk via the engaging portions, are simultaneously driven by the driving disk to displace respectively along the plurality of rail grooves toward the through groove until a distance between the plurality of turrets matches a configuration of the to-be-processed portion.

11. The turning and thread-rolling machine of claim 10, wherein each of said respective turning cutter mounts of the first turning device is provided with a respective first turning cutter adjacent to a first end of the associated turning cutter mount and a respective second turning cutter adjacent to a second end of the associated turning cutter mount and closer to the through groove than the first turning cutter.

12. The turning and thread-rolling machine of claim 11, wherein the second turning device is provided with four turrets, the four turrets are arranged in pairs along a vertical direction and a horizontal direction respectively, and the respective turning cutters on the pair of turrets arranged in one of the vertical direction and the horizontal direction are offset from the respective turning cutters on the pair of turrets arranged in the other of the vertical direction and the horizontal direction.

13. The turning and thread-rolling machine of claim 12, wherein in each of the first turning device and the second turning device, the driving disk has a side provided with a plurality of first teeth extending in a radial direction with respect to a rotation axis of the driving disk, the outer periphery of the main body is pivotally provided with at least one adjustment element, the at least one adjustment element having an end exposed on the outer periphery of the main body and an opposite end extending into the assembly groove and provided with a plurality of second teeth, and the plurality second teeth correspond in position to and are able to mesh with the plurality of first teeth so that the driving disk is rotatable by rotating the adjustment element.

* * * * *